United States Patent [19]

Cummings

[11] Patent Number: 4,495,443

[45] Date of Patent: Jan. 22, 1985

[54] COMPACT FLUORESCENT LAMP COMBINATION, AND METHOD OF MAKING IT

[76] Inventor: John H. Cummings, 11691 SE. Wilding Rd., Santa Ana, Calif. 92705

[21] Appl. No.: 574,479

[22] Filed: Jan. 27, 1984

[51] Int. Cl.³ .......................... H01J 7/44; H01J 17/34; H01J 19/78; H01J 23/16

[52] U.S. Cl. ...................................... 315/58; 313/493; 313/318; 315/50; 315/56

[58] Field of Search ................. 313/493, 318; 315/58, 315/56, 63, 61, 50; 339/210 T

[56] References Cited

U.S. PATENT DOCUMENTS

| | | | |
|---|---|---|---|
| Re. 18,798 | 4/1933 | Von Wedel | 315/56 |
| 1,348,394 | 8/1920 | Douglas | 339/144 |
| 1,640,434 | 8/1927 | Weston | 339/144 |
| 1,963,961 | 6/1934 | Barclay | 176/122 |
| 2,247,006 | 6/1941 | Whitmore | 173/332 |
| 2,298,961 | 10/1942 | Miller | 176/122 |
| 2,422,222 | 6/1947 | Carroll | 173/344 |
| 2,505,993 | 5/1950 | Rogers | 176/122 |
| 2,525,022 | 10/1950 | Dupuy | 240/51.12 |
| 3,551,736 | 12/1970 | Doehner | 315/100 |
| 3,815,080 | 6/1974 | Summa | 339/52 R |
| 4,208,604 | 6/1980 | Couwenberg | 313/113 |
| 4,225,905 | 9/1980 | Moriyama et al. | 362/216 |
| 4,258,287 | 3/1981 | Hetzel | 315/58 |
| 4,316,120 | 2/1982 | Cotman et al. | 315/58 |
| 4,326,149 | 4/1982 | Wyner et al. | 315/289 |
| 4,334,172 | 6/1982 | Wyner et al. | 315/289 |
| 4,337,414 | 6/1982 | Young | 315/56 |
| 4,347,460 | 8/1982 | Latassa et al. | 313/493 |
| 4,375,607 | 3/1981 | Morton et al. | 315/56 |
| 4,383,200 | 5/1983 | Van Zon et al. | 315/58 |
| 4,414,489 | 11/1983 | Young | 315/56 |

*Primary Examiner*—Saxfield Chatmon
*Attorney, Agent, or Firm*—Gausewitz, Carr, Rothenberg & Edwards

[57] ABSTRACT

In the present apparatus and method, there is first selected a compact fluorescent lamp having a small fluorescent tube and also having a base, there being two contact pins on the base, there also being on such base a starter housing which projects from the base on the side thereof remote from the tube. There is also selected a screw plug having a metal screw portion adapted to screw into a socket for an incandescent lamp bulb, and also having a contact button, the screw portion and contact button being mounted on a hollow insulating body which has a flange at its end remote from the contact button, the flange being recessed and having diametrally opposed boss portions on opposite sides of the body. There is then mounted, on the flange portion, a thin, insulating socket having conductive pin sockets therein adapted to receive the contact pins of the fluorescent lamp. The insulating socket also has an opening adapted to receive the starter housing. The socket is sufficiently thin that the starter housing projects downwardly, far into the body. The insulation socket is so mounted on the flange that, when the fluorescent lamp is assembled with the socket, the pins and pin sockets are disposed laterally of the boss portions instead of being registered therewith. A "ballast" coil and electrical connectors complete the apparatus, the ballast being caused to be in series-circuit relationship relative to the fluorescent lamp.

12 Claims, 7 Drawing Figures

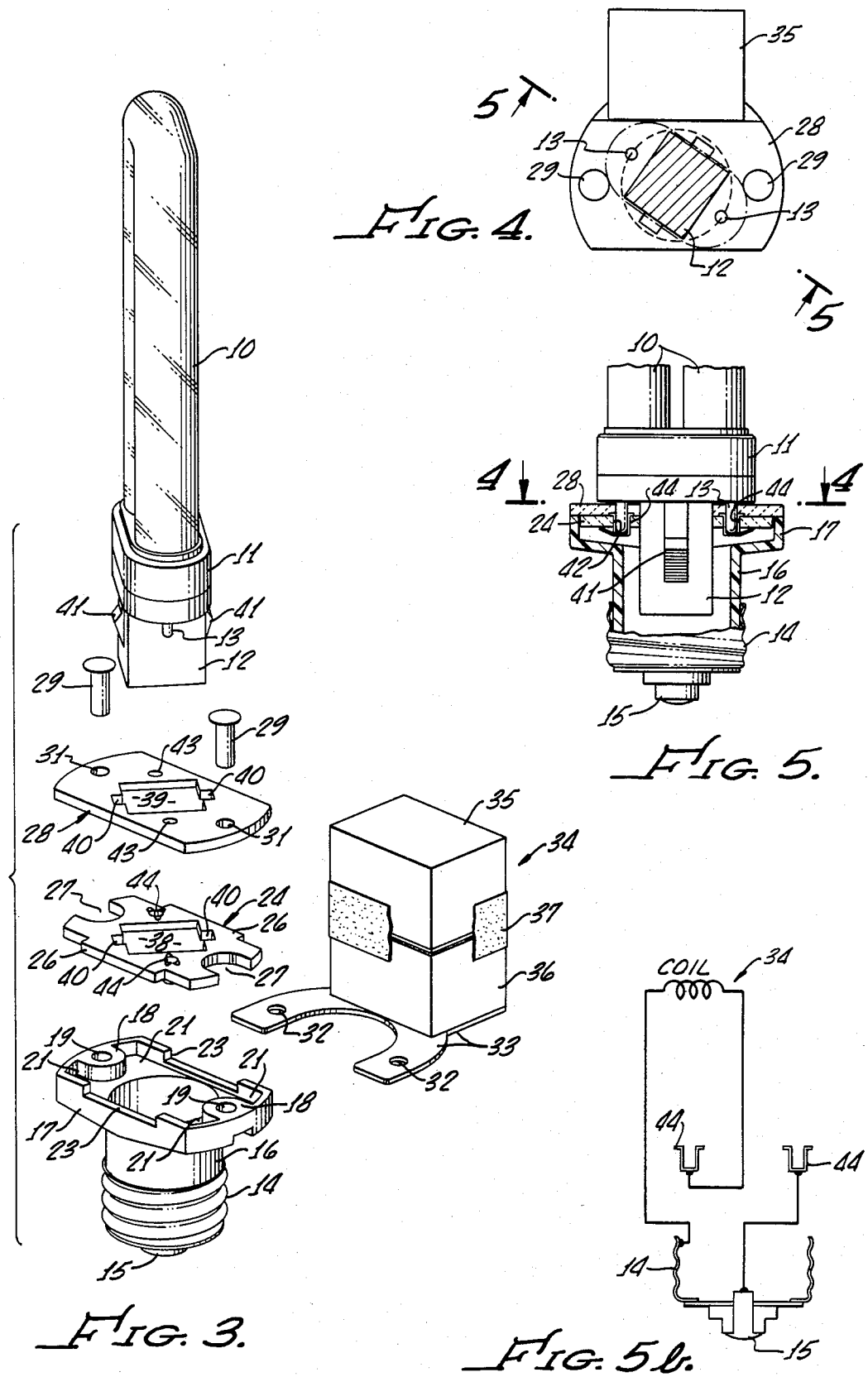

COMPACT FLUORESCENT LAMP COMBINATION, AND METHOD OF MAKING IT

BACKGROUND OF THE INVENTION

The amount of electrical energy consumed by exit lamps, table lamps (and wall and ceiling lamps), safety lamps, and security lamps is enormous. Some of these lamps burn night and day, every day of the year. The energy consumption may be reduced drastically by switching from incandescent lamps to fluorescent lamps, but there are great numbers of existing lamp fixtures that are constructed and sized for conventional incandescent lamp blubs. Because the replacement of such existing incandescent lamp fixtures would be prohibitively expensive, attempts have been made to provide small-size fluorescent lamps in combination with screw-type plugs adapted to thread into incandescent lamp sockets in existing fixtures. However, such substitute combinations are generally too large to fit into existing incandescent lamp fixtures for exit lamps, etc.

Compact fluorescent lamps are made by several companies. For example, one is manufactured under the trademark DULUX by Osram Company of Germany (one such lamp is shown at the top of FIG. 3 of the present drawings). Such lamps have starters located in plastic housings connected to the bases of the lamps. The starter housings project downwardly well below the pins to which electrical connections are made.

There are also on the market, in addition to such compact fluorescent lamps, mass-manufactured electrical-connector plugs adapted to screw into conventional sockets for incandescent lamp bulbs. Such plugs, one of which is shown in FIG. 2a of the present drawings, are desirable to use because the startup costs for manufacture of compact fluorescent lamp combinations are minimized where existing, on-the-market parts (such as that shown in FIG. 2a) can be utilized.

A prior-art approach to combining the compact fluorescent lamps with the screw plug shown in FIG. 2a is illustrated in FIG. 1 of the present drawings. As is there illustrated, the prior art employs an external extra socket (numbered 46) which receives both the starter portion of the lamp and the contact pins thereof. Such external socket is, in turn, associated with the screw plug of FIG. 2a, and there is associated therewith a "ballast" coil (inductor) which is matched to the fluorescent bulb. The ballast is incorporated in a housing as illustrated in FIG. 1.

A major problem is that the assembly of FIG. 1 is not only relatively expensive, but—much more importantly—will not fit in a very large proportion of incandescent lighting fixtures now in place relative to exit lamps, table lamps, etc. Thus, the degree of utilization of the prior-art approach of FIG. 1 is restricted to a great extent.

In accordance with the method of the present invention, which produces the compact fluorescent lamp combination shown in FIG. 2, start-up cost is also reduced while at the same time making the entire combination sufficiently small that it may be received in the vast majority of existing incandescent lighting fixtures used for exit lamps, table lamps, etc. cl BRIEF DESCRIPTION OF THE DRAWINGS FIG. 1 is an isometric view indicating a prior-art fluorescent lamp assembly for screwing into an incandescent lamp-bulb socket;

FIG. 3 is an exploded isometric view of the present compact fluorescent lamp combination;

FIG. 4 is a horizontal sectional view taken on line 4—4 of FIG. 5; and

FIG. 5 is a view, primarily in vertical section, taken generally on the plane indicated at 5—5 of FIG. 4; and FIG. 5b is a wiring diagram.

DESCRIPTION OF THE PREFERRED EMBODIMENT

Figure 1:
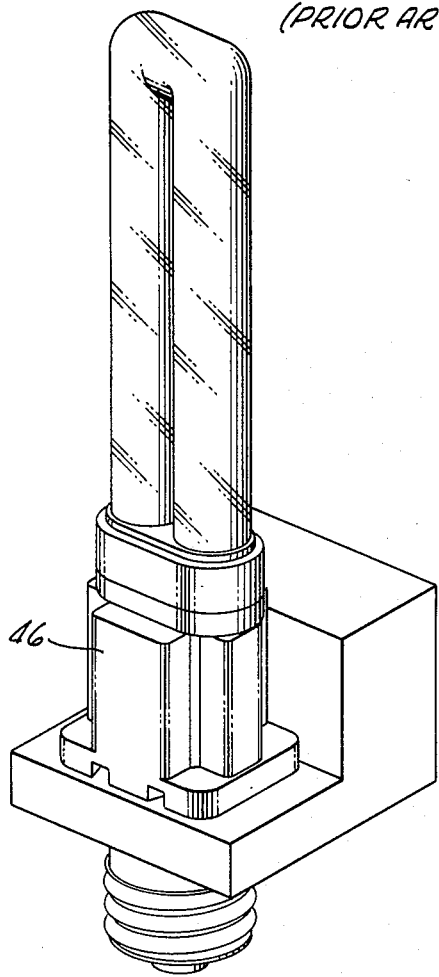

Referring first to the upper portion of FIG. 3, there is illustrated one of the compact fluorescent lamps. This has a U-shaped tube 10 with parallel arms. There is a metal base portion 11 connected to the arm ends. An elongated synthetic resin housing 12 projects downwardly from the base, in the opposite direction from the arms. Housing 12 contains the starter portion of the lamp.

Projecting downwardly from overhanging flange portions of starting housing 12 are metal pins 13 which provide electrical contact to the fluorescent lamp assembly, one such pin 13 being generally beneath each arm of the U.

Figure 2:
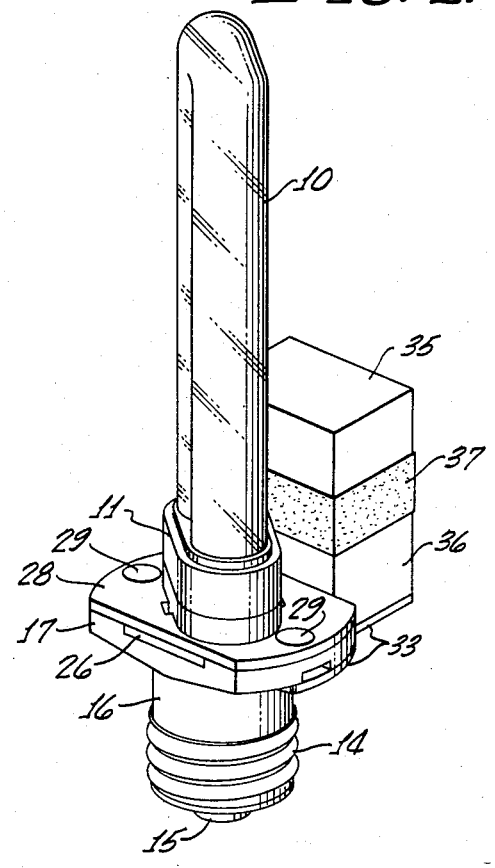
FIG. 2 is an isometric view of the present, reduced-sized fluorescent lamp combination for screwing into such a socket.
Figure 2A:
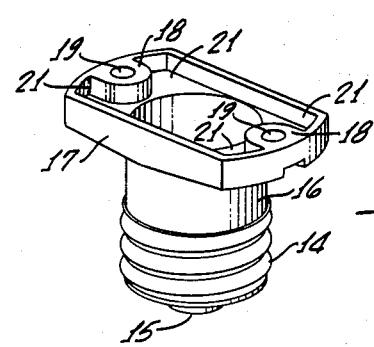
FIG. 2a is an isometric view of the prior-art plug employed in the assembly of FIG. 1 and also (in modified form) in the present invention.

The prior-art screw plug shown in FIG. 2a has a metal screw portion 14, and a metal button portion 15 disposed coaxially of and below portion 14, both portions 14 and 15 being adapted for insertion into a conventional screw-socket for an incandescent light bulb. Metal connector portions 14, 15 are mounted on a hollow cylindrical synthetic-resin body 16 having an upper flange portion 17. The upper flange portion 17 is recessed on the upper side thereof to form a single upper recess. At opposite regions of flange portion 17, diametrally of body 16, there are integral, internal boss portions 18 each of which is vertically apertured at 19 to receive a rivet or other fastener.

The boss portions 18 project towards each other, within the recess in flange 17. They, and the peripheral or side wall which is formed by the recessed configuration of the upper flange portion 17, cooperate with each other to define recess regions 21, there being two such regions adjacent each of the bosses 18.

DESCRIPTION OF THE PRESENT METHOD AND COMBINATION

There thus having been described the prior-art compact fluorescent lamp, and also the prior-art screw plug, there will now be described the method of creating a compact, inexpensive combination thereof—which combination will fit into the great majority of existing lamp-fixture sockets for incandescent light bulbs at exit signs, etc.

As the first step in the method, opposed side wall regions of the upper flange portion 17 of body 16 are cut out to form indent regions 23 illustrated at the lower portion of FIG. 3.

Thereafter, a first insulator layer 24 is nested into the recessed flange portion 17 of body 16. Layer 24 may be formed of insulating fibrous material, insulating synthetic resin, etc. As shown in the lower region of FIG. 3, layer 24 has protuberant side-edge regions 26 adapted to nest into indent regions 23. Layer 24 also has recessed or indented regions 27 shaped to receive the boss portions 18. The depths of indent regions 23, and the thickness of first layer 24, are preferably such that the upper surface of layer 24 is flush with the rim of flange 17 of body 16, as shown in FIG. 5.

As the next step in the method, a second insulator layer, numbered 28, is mounted over first layer 24 in flatwise engagement therewith. The periphery of second layer 28 is shaped correspondingly to the shape of the rim of flange 17 of body 16, prior to indentation of such rim.

As the next step, the insulating layers are secured to each other and to flange 17 by rivets (FIGS. 2-4) that extend downwardly through holes 31 in layer 28 and also through the apertures 19 in bosses 18.

The same rivets 29 are also caused to extend downwardly through holes 32 in a generally Y-shaped sheet-metal yoke 33. The arms of yoke 33 fit around cylindrical body 16, and the base or stem portion of the yoke is riveted to the underside of the housing of a "ballast" coil or inductor 34. Inductor 34 perferably has upper and lower open-ended—at their adjacent ends—housing portions 35 and 36 which seat over the actual winding, such housing portions being secured together by insulating tape as shown at 37. The indicated housing and tape construction permits different length coils to be employed without substantial increase in the cost of manufacture, by varying the gap between the open ends of housing portions attached to different sizes of fluorescent lamps.

According to an important aspect of the present method and combination, the fluorescent lamp is not so oriented as to be parallel to a line extending through the centers of apertures 19 diametrally of cylindrical body 16. Instead, the fluorescent lamp is so turned that a plane containing the axes of the parallel lamp tubes (arms) lies at an acute angle to the above-indicated diametral line extending through apertures 19. As an example, such acute angle may be on the order of 35° relative to such diametral line.

Referring to the upper portion of FIG. 3, and to FIG. 4, the starter housing 12 is rectangular in horizontal section and has its major axis perpendicular to a plane containing the axes of both arms of U-tube 10. Therefore, to achieve the described angular orientation of the U-tube, the housing 12 is caused to be inserted through registered rectangular openings 38 and 39 in insulator layers 24 and 28, such openings being oriented with their major axes complementary to the above-indicated angle of U-tube 10. Thus, in the stated specific example, the major axes of openings 38 and 39 are about 55° from the diametral line passing through the centers of apertures 19.

Openings 38 and 39 are shaped and sized to snugly receive starter housing 12, and act as supporting socket means for the lamp. There are recesses 40 in layers 24 and 28 at the ends of openings 38 and 39, and which loosely receive side protuberances 41 formed integrally on the starter housing 12 of the fluorescent lamp.

There will next be described the electrical connector and wiring aspects of the present method and combination.

Insulator layers 24 and 28 are formed with registered holes 42 and 43 adated to receive the metal pins 13 which are part of the compact fluorescent lamp. The holes 42, 43 are adjacent the side edges of insulator openings 38 and 39. The underside of the upper insulator (second insulator) 28 is recessed or counterbored around its holes 43, so as to receive the upper portions of metal pin sockets 44 which are fit into holes 42 in the first or lower insulator 24. Such sockets are pressed into the insulator 24 prior to mounting thereof, are wired to remaining elements of the combination as next described, and then are covered by the second insulator layer 28 so as to eliminate any shock hazard.

The fluorescent lamp and the ballast are caused to be in series-circuit relationship relative to each other, between screw portion 14 and button 15, as shown in FIG. 5b. Thus, a wire is connected between button 15 and one of the pin sockets 44. A second wire is connected between metal screw connector 14 and one terminal of ballast 34. The remaining terminal of the ballast is connected to the remaining pin socket 44.

The described method and construction cause the lower ends of pins 13, and the pin sockets 44 in which such pin ends are inserted, to be disposed in recess regions 21 (FIG. 3) defined between boss portions 18 and internal wall portions or the flange 17 of body 16. There is therefore adequate space, for electrical insulation purposes, between sockets 42 and the metal rivets 29 which extend through apertures 19. Thus, the assembly is electrically safe as well as highly compact, having a small vertical dimension permitting its mounting in large numbers of existing incandescent-lamp sockets at exit signs, etc.

As shown in FIG. 5, the starter housing 12 penetrates deeply into body 16, even down into the metal screw portion 14. The flange region of the starter housing seats on the upper surface of second (upper) insulating layer 28, only a short distance above the rim of flange 17 of plug body 16.

The construction and method of the present invention are to be compared with the prior art showing of FIG. 1, in which a large, separate, external socket 46 is provided between the prior-art plug (FIG. 2a) and the prior-art fluorescent lamp. In comparison to the indicated prior-art assembly (FIG. 1), the present assembly (FIG. 2) saves well over an inch in height alone, making the present assembly more nearly resemble the size of a conventional incandescent light bulb, so that (especially when clearance adjacent the incandescent light bulb are taken into account) the present assembly will, as stated above, fit into the vast majority of light fixtures of the type indicated herein.

The foregoing detailed description is to be clearly understood as given by way of illustration and example only, the spirit and scope of this invention being limited solely by the appended claims.

What is claimed is:

1. A method of manufacturing a combination fluorescent lamp and screw plug, said method comprising:
    (a) selecting a compact fluorescent lamp having relatively small fluorescent tube means and a base, and also having two contact pins on said base, and also having a starter housing projecting from said base on the side thereof remote from said tube means,
    (b) selecting a screw plug having a metal screw portion adapted to screw into a socket for an incandescent lamp bulb, and also having a contact button coaxial to said screw portion and near one end thereof, and also having a hollow insulating cylindrical body on which said screw portion and contact button are mounted, and also having a flange portion at the end of said body remote from said button, said flange portion being recessed on the side thereof remote from said button, said flange portion having inwardly-extending apertured boss portions that define, together with wall portions of said flange portion, recess regions on opposite sides of each boss portion, said boss portions being along a line diametral to said body and being on opposite sides of said body, (c) mounting, on said flange portion, thin and insulating socket means having pin-socket means therein adapted to receive said contact pins, and having opening means adapted to receive said starter housing, said socket means being sufficiently thin that said starter housing projects downwardly into said hollow cylindrical body, said mounting step being so effected that said pin-socket means are registered with said recess regions whereby said pins will be registered with said recess regions when said lamp is assembled with said screw plug and said insulating socket, (d) mounting "ballast" coil means on said screw plug, and (e) electrically connecting said screw portion, contact button, pin sockets, and ballast coil means in circuit with each other.

2. The invention as claimed in claim 1, in which said method further comprises the step of indenting sidewall portions of said flange portion of said insulating body, and providing said socket means in the form of two insulating layers the lower one of which nests downwardly into said flange portion and has protuberant portions which seat in the indents in said side-wall portions, and the upper one of which seats over said flange portion, said upper and lower layers having registered openings therein adapted to receive said pins.

3. The invention as claimed in claim 1, in which said method further comprises the step of mounting said "ballast" coil means by introducing rivets through the apertures in said boss portions, and also through said socket means, and also through openings in a yoke which extends around said cylindrical body, said yoke being connected to a housing portion of said coil means.

4. A screw-plug base adapted to be combined with a compact fluorescent lamp, said compact fluorescent lamp having relatively small fluorescent tube means and also having a base, and further having two contact pins on said base, and further having a starter housing projecting from said base on the side thereof remote from said tube means, said screw-plug base comprising:

(a) a screw plug having a metal screw portion adapted to screw into a socket for an incandescent light bulb,
said screw plug also having a contact button coaxial to said screw portion and near one end thereof, said screw plug also having a hollow insulating cylindrical body on which said screw portion and contact button are mounted, said screw plug also having a flange portion at the end of said body remote from said button,
said flange portion being recessed on the side thereof remote from said button,
said flange portion having inwardly-extending apertured boss portions that define, together with wall portions of said flange portion, recess regions on opposite sides of each boss portion,
said boss portions being along a line diametral to said body and being on opposite sides of said body, (b) thin and insulating socket means mounted on said flange portion,
said insulating socket means having pin-socket means therein adapted to receive said contact pins,
said socket means further having opening means therein adapted to receive said starter housing,
said socket means being sufficiently thin that said starter housing projects downwardly into said hollow cylindrical body when said fluorescent tube is assembled with said screw plug,
said pin-socket means being registered with said recess regions whereby said pins will be registered with said recess regions when said fluorescent lamp is assembled with said screw plug, and (c) "ballast" coil means mounted on said screw plug.

5. The invention as claimed in claim 4, in which said fluorescent lamp is combined with said screw plug.

6. The invention as claimed in claim 5, in which said fluorescent lamp has two parallel tube portions the axes of which lie in a certain plane, and in which said socket means is so turned relative to said flange portion of said insulating body that said plane lies at an acute angle to a line which is diametral to said insulating body and extends through the apertures in said boss portions.

7. The invention as claimed in claim 6, in which said socket means comprise two insulating layers in flatwise engagement with each other, the lower one of said layers being nested into said flange portion, said lower one of said layers incorporating said pin-socket means, the upper one of said layers being mounted over said flange portion, both of said layers being connected to said flange portion by fasteners extended through the apertures in said boss portions.

8. The invention as claimed in claim 7, in which said ballast coil means is mounted to said screw plug by means of a yoke having openings which are registered with said apertures in said boss portions, and which receive said fasteners.

9. The invention as claimed in claim 4, in which said socket means (b) is sufficiently thin that the lower ends of said contact pins extend below the level of the upper edges of said wall portions of said flange portion when said lamp is fully inserted in said screw-plug base.

10. A combination compact fluorescent lamp and screw-plug socket, said combination comprising:

(a) a compact fluorescent lamp throw-a-way type having parallel fluorescent tube portions which connect to a base portion,
said lamp also having an elongated starter housing permanently connected to said base portion and projecting from said base portion in a direction opposite the direction of projection therefrom of said tube portions,
said fluorescent lamp also having contact pins mounted on said base portion and disposed on opposite sides of said starter housing in parallel relationship relative to said starter housing and said tube portions, (b) a screw plug having an insulating cylindrical hollow body,
said screw plug also having a metal screw contact portion mounted on said body coaxially thereof and adapted to screw into a conventional incandescent lamp socket,
said screw plug also having a contact button coaxial to said metal screw portion, said screw plug also having a flange portion provided on said insulating body at the end of said body remote from said contact button, (c) socket means provided in said screw plug and having said starter housing inserted therein, said starter housing being telescoped downwardly a major distance into said insulating body, said socket means also including pin sockets having inserted therein said pins of said fluorescent lamp, said combination fluorescent lamp and screw plug being highly compact because of said telescoping of said starter housing into said insulating body of said screw plug, and ballast means mounted on said flange portion of said screw plug and projecting therefrom in the same direction as said tube portions of said lamp.

11. The invention as claimed in claim 10, in which said socket means (c) is shaped to receive and hold said lamp without screws or other fasteners, and in which no screws or other fasteners are employed for holding said lamp.

12. A combination compact fluorescent lamp and screw-plug socket, said combination comprising:

(a) a compact fluorescent lamp having parallel fluorescent tube portions which connect to a base portion, said lamp also having an elongated starter housing projecting from said base portion in a direction opposite the direction of projection therefrom of said tube portions, said fluorescent lamp also having contact pins mounted on said base portion and disposed on opposite sides of said starter housing in parallel relationship relative to said starter housing and said tube portions, (b) a screw plug having an insulating hollow body, said screw plug also having a metal screw contact portion mounted on said body and adpated to screw into a conventional incandescent lamp socket, said screw plug also having a contact button coaxial to said metal screw portion, said screw plug also having a flange portion provided on said insulating body at the end of said body remote from said contact button, and (c) socket means provided in said screw plug and having said starter housing inserted therein, said starter housing being telescoped downwardly a major distance into said insulating body, the amount of said telescoping being at least such that the end of said starter housing remote from said tube portions of said lamp penetrates to the vicinity of the end of said metal screw contact portion that is remote from said contact button, said socket means also including pin sockets having inserted therein said pins of said fluorescent lamp, said combination fluorescent lamp and screw plug being highly compact because of said telescoping of said starter housing into said insulating body of said screw plug.

* * * * *

UNITED STATES PATENT AND TRADEMARK OFFICE
CERTIFICATE OF CORRECTION

PATENT NO. : 4,495,443

DATED : Jan. 22, 1985

INVENTOR(S) : JOHN H. CUMMINGS

It is certified that error appears in the above–identified patent and that said Letters Patent are hereby corrected as shown below:

Claim 10 (colum 7), line 15, before "ballast" insert -- (d) --.

Signed and Sealed this

Sixth Day of August 1985

[SEAL]

*Attest:*

DONALD J. QUIGG

*Attesting Officer*     *Acting Commissioner of Patents and Trademarks*